United States Patent [19]

Manor

[11] Patent Number: 4,858,329
[45] Date of Patent: Aug. 22, 1989

[54] A SURVEYING AND MAPPING APPARATUS FOR INDICATING THE LEVEL DIFFERENCES OF THE GROUND TRAVELLED IN RELATION TO THE DISTANCE TRAVELLED

[75] Inventor: Gedalyahu Manor, Haifa, Israel

[73] Assignee: Technion Research & Development Foundation Ltd., Haifa, Israel

[21] Appl. No.: 143,066

[22] Filed: Jan. 12, 1988

[51] Int. Cl.[4] ............................................... G01B 7/00
[52] U.S. Cl. ...................................... 33/775; 33/313; 33/1 H; 33/544
[58] Field of Search ...................... 33/521, 1 H, 141.5, 33/142, 523, 1 PT, 544

[56] References Cited

U.S. PATENT DOCUMENTS

| 3,571,937 | 3/1971 | Sears | 33/312 |
| 3,604,119 | 9/1971 | Inoue | 33/141.5 X |
| 4,137,638 | 2/1979 | Watts | 33/141.5 |
| 4,399,692 | 8/1983 | Hulsing et al. | 33/313 X |

FOREIGN PATENT DOCUMENTS 229598 9/1963 Austria ................................. 33/141.5

Primary Examiner—William D. Martin, Jr.
Attorney, Agent, or Firm—Browdy and Neimark

[57] ABSTRACT

A surveying and mapping implement indicates the level differences of the ground over which it travels, in relation to the distance travelled. It comprises a carriage consisting of a swivelling front wheel, two center wheels attached to the outside of a U-shaped vertical frame, and two rear wheels connected to the U-shaped frame by means of a thill and a universal joint positioned co-extensive with the axis of the center wheels. The universal joint permits the rear wheels to move up and down and sideways, as well as to twist in relation to the center wheels. The wheel base between the center wheels and the front wheel is identical with that between the center wheels and the rear wheels, in order to facilitate calculations. Recording instruments are provided on the carriage adapted to measure the distance travelled, the different angles of inclination and of angular twist of the rear wheels in relation to the center wheels, and to transmit their output to computer means adapted to record the surface features of the ground.

5 Claims, 5 Drawing Sheets

A SURVEYING AND MAPPING APPARATUS FOR INDICATING THE LEVEL DIFFERENCES OF THE GROUND TRAVELLED IN RELATION TO THE DISTANCE TRAVELLED

BACKGROUND OF THE INVENTION

1. Field of the Invention

The present invention concerns a system and implement for the surveying and mapping of land surfaces by recording unevennesses, and for serving as navigation aid especially in uneven terrain.

2. The Prior Art

The precise recording of surface features causing unevenness of the topography is of importance not only in map-making but, on a smaller scale, in such activities as agriculture and road and airfield construction. In agriculture, unevennesses must be discovered and evened out in order to prevent the undue collection or runoff of rain and irrigation water and to obviate the impairment of the accuracy of farm machinery working, which is unpredictably affected by topographical irregulaties which influence, among other things, the depth of penetration of such implements as cultivators, planting machines, and the like. In airfield runway and road construction, uneven surfaces—caused by uneven foundations—lead to excessive vibrations and rough rides, especially at high speeds, as well as to the accumulation of rain water in puddles.

A great number of implements, relying on a variety of principles, have been devised and are in more or less widespread use. The following are worth mentioning:

Israel Patent Number 38696 is based on the recording of the movements of a damped pendulum. The degree of damping is critical to this type of instrument, since too little will cause excessive swings owing to the influence of inertia, while too much damping will adversely affect the responsiveness of the device. These difficulties have militated against its general introduction.

Also based on a mechanical construction is the so-called inertial platform, which is carried on a vehicle and relies on gyroscopes to maintain a steady position against which deviations from the plane are measured and recorded. One drawback of this system is its extremely high price, another that it is prone to a number of errors that must be taken into account if acceptable results are to be obtained.

Optical principles and techniques are employed in the photogrammetric surveying of the ground, generally from high or low-flying aircraft depending on the quality of the details desired. An important disadvantage of this method is the fact that results are received only after a certain delay, because of the need for processing the photographs taken.

A more modern application of optical methods is a system using laser beams and known under the Trade Name of LASERPLANT. A revolving laser beam creates a stationary plane of monochromatic light against which deviations are measured and recorded by means of a pick-up device locked onto it and carried on an expandable mast mounted on a vehicle, the pick-up being raised and lowered by the mast in accordance with the irregularities encountered. Again, one of the drawbacks is its high price and limited range.

Finally, deviations from the plane can be measured by vehicle-borne ultrasonic sounding equipment. However, the applicability of this system is limited especially by the fact that no plane of reference can be resorted to.

All the methods enumerated, with the exception of the "Laserplan" type of device, have the one common drawback of their inability to refer their measurements to a common plane of reference and will thus give a little or no indication of the overall nature of the terrain surveyed; nor can any of them be used as navigational aids. The "Laserplan" type of device, for its part, is limited in its ranges, both horizontally (distance from the revolving laser beam) and vertically (the heights recordable being circumscribed by the properties of the mast carrying the pick-up device).

The present invention seeks to overcome these drawbacks by presenting a system that is both simple and rugged and produces results that are invariably referred back to a plane of reference, viz. the plane from which the survey initially started.

SUMMARY OF THE INVENTION

The implement of the invention consists of two carriages connected together by a centrally located universal joint, a first carriage—generally the leading one and thus referred to in this specification—having at least two wheels, one behind the other in the direction of travel, but preferably three or four for the sake of stability; the second carriage,, generally the trailing one, having one wheel only or preferably two co-axial wheels. For the sake of simplicity, the distance between the axis of the front and the rear wheels of the leading carriage—the latter wheel also being referred to as the centre wheel of the implement—equals the distance between the axis of the centre wheel and that of the trailing wheel, the latter also referred to as the rear wheel of the system.

The leading carriage is preferably self-propelled, such as an overland motor car, e.g. a Jeep. At least one of the wheels is equipped with a device for measuring the distance travelled. Two further measurement devices are fitted, one to measure the vertical angle between the two carriages, the other to measure the horizontal angle. The readings of the three measuring devices—all of a type delivering electrical signals—are fed into a computer carried on one of the carriage—generally the leading one—which is programmed to produce the horizontal distance travelled, the actual route traversed, and the profile of the route travelled.

At the beginning of the survey care should be taken that the implement stands on a horizontal plane in such a manner that the vertical and the horizontal angles between the two carriages are Zero and that the direction in which the implement points is known. All the measurements and surface recordings that follow will then automatically be referred back to the initial plane and direction.

By adding a video display screen (or x-y-z recorder of known design) on which a map of the area surveyed is projected as well as the route travelled by the implement of the invention, the position of the implement in the area can be shown at any desired moment; and when the point to be eventually reached is also projected—determined by beeline direction and azimuth angle—the implement serves as a navigational aid in difficult terrain.

Optionally, a third angle-measuring device producing an electrical signal may be added in order to measure the angle of twist between the axis of the implement's centre wheels and that of the rear wheels (when the latter are trailed) or that of the front wheels (when the latter are pushed). In that manner a transverse profile of the route travelled may be obtained. When a more precise transverse profile is desired, one of the carriages may be fitted with a transverse boom to which instruments measuring the distance between the boom and the ground—the height of the instrument above ground—are attached, such instruments being placed at intervals and in numbers according to the precision required. Instruments of this kind are known to the art and may be of the mechanical, optical, ultrasonic, or short or ultra-short wave (electro-magnetic) type. Obviously, both when the angle of twist and/or the transverse profile is to be measured, two wheels must be trailed or pushed.

BRIEF DESCRIPTION OF THE DRAWINGS

FIG. 1b is a schematic view from above of the implement of the invention, showing the front vehicle frame foreshortened because of the drop of the front wheels as shown in FIG. 1a;

DESCRIPTION OF PREFERRED EMBODIMENT

The functioning of the system will now be explained with the aid of the drawings. Referring to FIG. 1, the implement consists of two carriages, the frames of which are represented by a straight line each, (1) being the leading carriage, (2) denoting the led carriage. It will be understood that the led carriage could be either pulled or pushed by the leading carriage; in the following, however, reference will always be made to the arrangement wherein the led carriage is pulled, and a tractor-relationship will be used in order to avoid confusion.

Figure 1A:
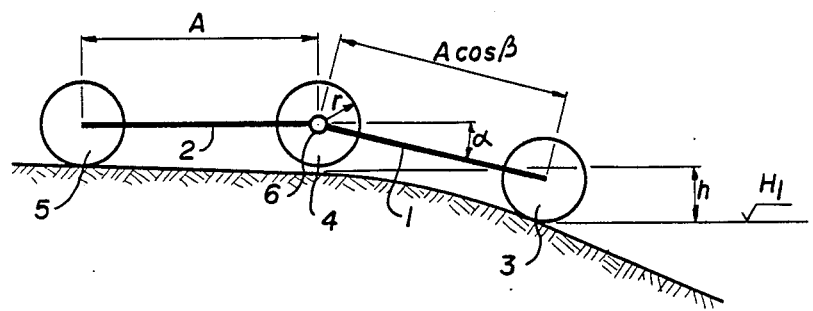
FIG. 1a is a schematic side view of the implement, showing the front carriage frame foreshortened because of its deflection as shown by FIG. 1b.

The leading carriage has two wheels shown, one behind the other—(3) and (4) respectively being the front and centre wheels of the system—the trailing carriage (so called whether pulled as illustrated or pushed) has one wheel, the rear wheel of the implement as illustrated. FIG. 1a being a schematic side view, any other wheels on the same axis will be hidden; but for the explanation of the principle only one wheel of each type is needed. The leading carriage is preferably a self-propelled vehicle of the cross-country type; the trailing carriage, which essentially consists of a shaft or thill and a traverse for attachment of the wheels, or a fork if only one wheel is fitted, may have two wheels on the same axis, the space between them, conveniently but not necessarily, being of the same order as that between the centre wheels, or it may have one wide-rimmed wheel, both alternatives ensuring upright stability.

Figure 4:
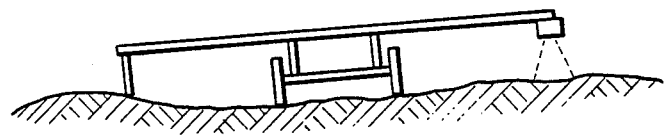
FIG. 4 schematically shows a boom and a height-measuring instrument for producing a transverse profile.
Figure 7:
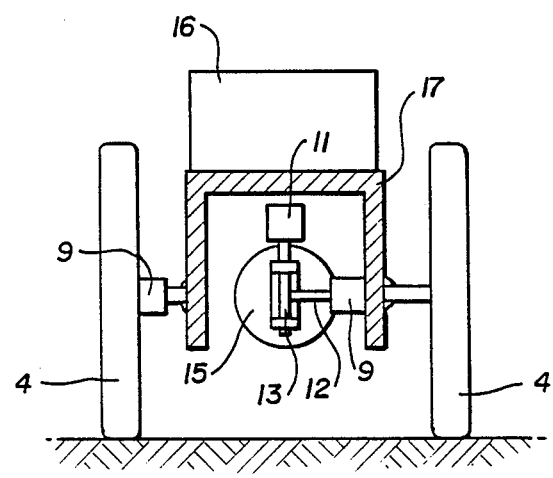
FIG. 7 is a cross section along line C—C of FIG. 5.
Figure 6:
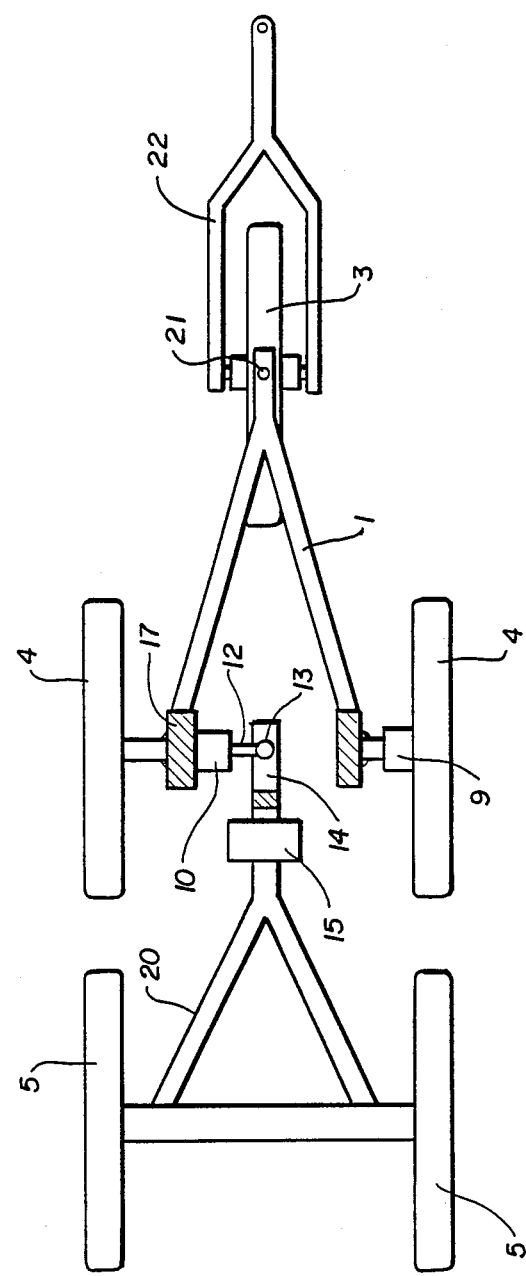
FIG. 6 is a plan view and section along line B—B of the implement illustrated in FIG. 5.

The two carriages are connected together by means of a universal joint as illustrated in FIGS. 4, 6 and 7. In the initial position, at the outset of the survey, the implement should stand on a level plane so that the two frames, represented by lines (1) and (2) linking the hubs of the wheels—are in one straight line. The distance between the axes of the front and center wheels of the implement is "A" as is that between the axes of the center and rear wheels. This equality greatly simplifies the mathematics and consequently the programming of the associated computer; but unequal lengths are not excluded provided programming is adjusted accordingly. Such inequality may occur if, for example, self-propelled vehicles of different wheel-bases are used with one and the same trailer. In that case either provision must be made for this contingency in the computer program or the shaft of the trailing carriage must be made expandable and contractable and be adjusted to the appropriate length.

Figure 1B:
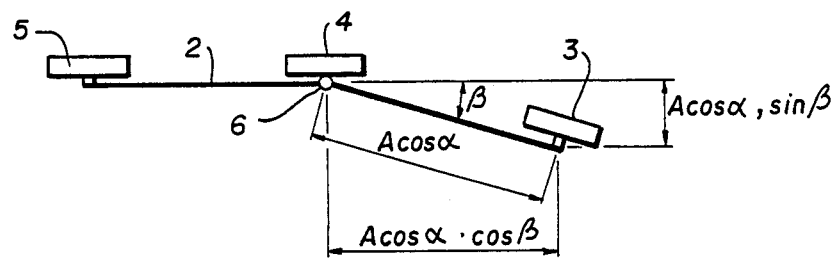

The position shown in FIG. 1 is one in which the implement's front wheels have entered a depression, so that the two frames form an angle a as shown. At the same time the tractor has turned from the straight line pointed by the shaft (2) of the trailer through an angle b which is illustrated in FIG. 1b and indicated in FIG. 1a by the foreshortened length of the frame, given by A cos b. The front wheel has dropped through a height h to its new position H after travelling a distance equal to the distance between the axes of the front and center wheels of the implement. The distance so tavelled is measured by an odometer device 9, shown positioned on the center wheel (FIGS. 6 and 7), although it may be connected to any of the other wheels. The height h through which the front wheel has dropped is given by the formula h=A sin a, and the relative height of point $H_1$, if the altitude of the initial position, $H_o$, is known, by the formula $H_1 = H_o - h = H_o - A \sin a$. Obviously, since sin(−a)=−sin a, the sign of the sine will be negative when the front wheel drops relative to the center wheel and positive when it rises.

Figure 2:
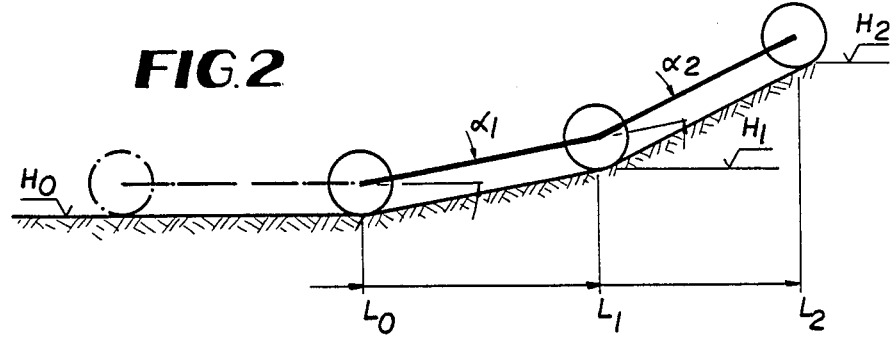
FIG. 2 illustrates schematically two consecutive positions of the implement of the invention.

FIG. 2 assists in arriving at a general formula. Here the front wheel of the implement has risen to a point $H_1$ and has then continued to rise, to arrive at a further point $H_2$. The center wheel is now at $H_1$, and the rear wheel has reached the position initially occupied by the center wheel. The height of the point attained by the front wheels relative to the initial point, viz. $H_o$, is given by $H_2 = H_1 + A \sin(a_1 + a_2)$, where $a_2$ is the vertical angle between the two carriage frames upon their reaching point $H_2$, while $a_1$ is the vertical angle between the two frames that existed when the front wheel was at $H_1$. Similarly, if the ascent continues and a point $H_3$ is reached, the height relative to the initial position $H_o$ will be $H_3 = H_2 + A \sin(a_1 + a_2 + a_3)$, where $a_3$ is the vertical angle between the vehicle frames at point $H_3$. At any point, $H_i$, the height relative to the initial position is:

$$H_i = H_{i-1} + A \sin\left(\sum_1^i a_i\right).$$

For the use of the system of the invention as an aid to navigation the horizontal distance travelled is of special importance. That distance can be determined by similar reasoning; thus, with the symbols used in FIG. 2:

$$l_1 = l_0 + A \cos a_1$$

$$l_2 = l_1 + A \cos(a_1 + a_2)$$

$$l_i = l_{i-1} + A \cos\left(\sum_1^i a_i\right)$$

Figure 3:
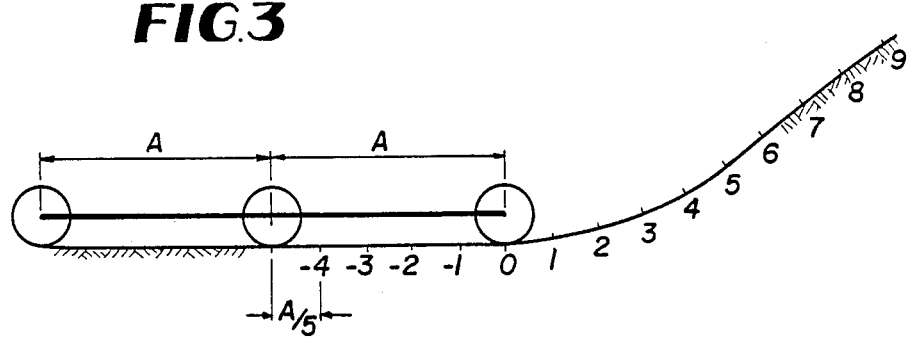
FIG. 3 describes the method of increasing the accuracy of profile drawings.

Measurements will be taken, and calculations made, whenever the center wheel has reached the position occupied by the front wheel at the preceding measurement-taking, as indicated by the odometer signal. If greater accuracy is desired, the individual distances between measurements will be shorter than a, as illustratted by FIG. 3, in which the distance referred to is assumed to be A/5. In that case:

$$H_1 = H_o + A \sin a_1$$
$$H_2 = H_0 + A \sin a_2$$
$$H_3 = H_o + A \sin a_3$$
$$H_4 = H_o + A \sin a_4$$
$$H_5 = H_o + A \sin a_5$$
$$H_6 = H_1 + A \sin(a_1 + a_6)$$
$$H_7 = H_1 + A \sin(a_2 + a_7)$$

and so on; and generally:

$$H_i = H_{i-n} + A \sin\left[\sum_{j=0}^{k} a_i - (k-j)n\right]$$

where k is an integer being the quotient of i/n, and the distance between measurements is a/n.

Similarly, the distance travelled along the path taken by the system is given by the formula:

$$l_i = l_{i-n} + A \cos\left[\sum_{i=0}^{k} a_i - (k-j)n\right]$$

The computer carried by the system will be programmed accordingly.

Turning now to the universal joint—6 in FIG. 1b—linking the two parts of the system of the invention, in engineering practice a universal joint consists of two forks, one each at the ends of two abutting shafts, the two forks being positioned so that the lines linking the ends of their two prongs are at right angles to each other. Each of the two forks, and with them the shafts to which they are attached, is free to swing round an axle situated between the two prongs, the two axles being fixedly joined together. With the aid of this device the two shafts can assume a wide range of angles with respect to each other, yet they may revolve together in the same direction.

For the present invention this concept has been modified to satisfy the particular requirements of the link between the leading vehicle and the trailer and to accommodate the angle-measuring devices.

Figure 5:
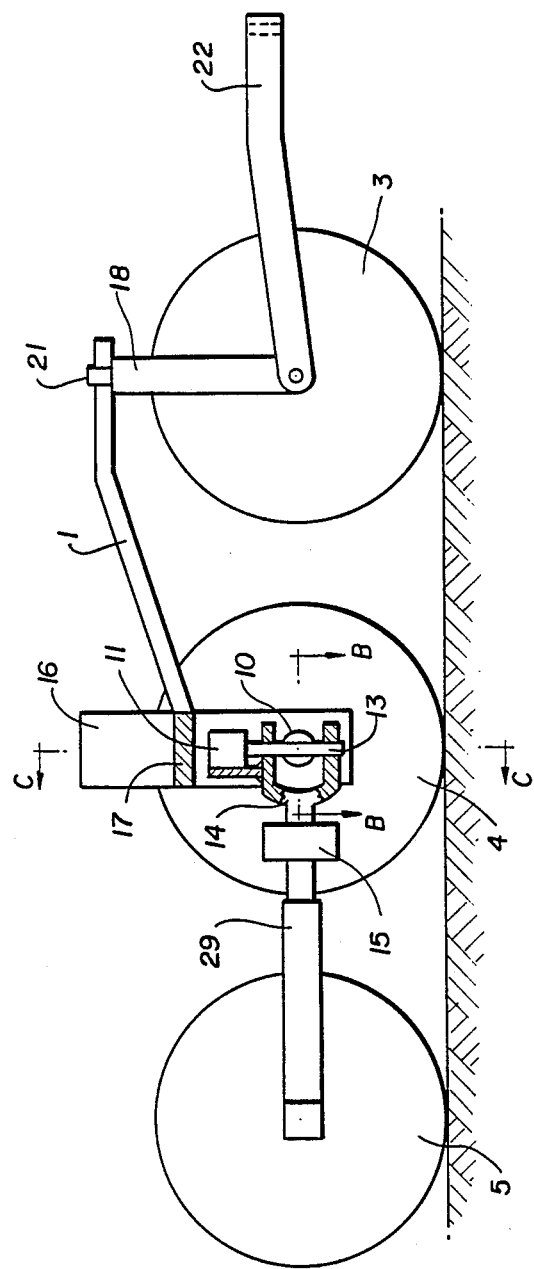
FIG. 5 is a side view of an implement showing a vertical section of a universal joint connecting the leading and the led carriage.

A preferred embodiment of the idea will now be explained with the aid of FIGS. 5, 6 and 7.

A U-shaped vertical frame 17, rigidly connected to the chassis or frame 1 of the leading carriage, bears the two center wheels 4, as well as the measuring instruments serving the present invention, namely the device measuring the vertical angle a, (10), the device measuring the horizontal angle b, (11), and the odometer (9), which measures the distance travelled by the implement as evidenced by the revolutions of the center wheel, to which it is attached. The rear wheel or wheels is (are) attached to the leading vehicle by means of a thill 20 via a bearing 15, which permits the thill to turn axially (to "twist") when either the leading carriage or the trailer, or both, twist owing to the unevenness of the terrain. The thill ends inside the U-shaped frame in a vertical fork 14. It can turn through a horizontal angle, being pivoted on a vertical axis 13, itself rigidly fixed at right angles to a stub 12, which is concentric with the centre wheels and which, in turn, is pivoted on the measuring device 10, measuring the vertical angle between the leading vehicle and the trailer, transmitted to the instrument by the thill 20. The readings of all the instruments—the odometer 9, the device 10 recording the vertical angle 10, and the device 11 recording the horizontal angle—are transmitted to the computing device 16, which is programmed to display, on a screen, the route travelled and to calculate the profile with reference to the point of departure. The universal joint is represented by the fork 14, the bearing 15, and the T-shaped combination of pivots 12 and 13. When it is desired to include in the display the angle of twist, a suitable probe is attached to the bearing 15, on the trailer thill, and the signals generated by the probe are transmitted to the computer 16.

The first carriage is provided with a single front wheel 3 which is swivellingly attached to the front portion of the frame 1 by means of a vertical fork 18 and a vertical pin 21 which is rotatingly fitted in the front end of the frame 1. A drawbar 22 serves to attach the implement to a traction vehicle.

As an alternative the implement may be self-propelled by an I:C-engine mounted on the first carriage.

Owing to the presence of the measuring instruments and the universal joint associated with them it is advisable, in the case of the thill 20, and the trailer connected with it being trailed rather than pushed, that the leading carriage be of the front-wheel-drive type. When the "trailer" is pushed, a rear-wheel-drive carriage will be found preferable, but in this case the steering action of the front wheels and the mechanism associated with it are likely to complicate the construction.

When the entire system—leading carriage and trailer—is trailed or pushed, the stub 12, can easily be mounted concentrically with the center wheels; and the vertical angle, a, will then automatically be the "true" angle as shown in FIGS. 1 and 2. When the U-shaped frame 17, containing the universal joint and the measuring and other apparatus is designed as a separate, detachable unit, to be mounted on self-propelled vehicles drawing or pushing the trailer, provision must be made in the computer program for the different vertical angles measured, since the pivot 12 is offset against the axis of, respectively, the rear or the front wheel of the selfpropelled carriage. Alternatively the lead carriage's thill 20 which is expandable and contractable, must be adjusted so that the distance between the axis of the rear wheel and the axis of the pivot 12, equals the distance between the axis of the pivot 12, and the axis of the rear wheels—if the system of the invention is trailed, or that of the front wheels—if the system is pushed. The level of the pivot 12 should be that of the center of the rear or front wheels.

The U-shaped box should conveniently, and for reasons of mechanical strength, have at least three sides, viz. two substantially parallel lateral sides to which the center wheels can be attached—in the case of the self-propelled carriage, or the pivot 12, with its angle-measuring instrument—if the U-shaped box is made detachable; and a third side connecting the two lateral ones. The remaining three sides may be partially closed to protect the devices inside it; but free play must be afforded the thill 2. Strictly speaking, only one, preferably upright, side is required, since all the devices are attached to one lateral side of the box; but for reasons of security, cleanliness in field conditions, etc., a U-shaped box or partially enclosed box will be preferred.

I claim:

1. A surveying and mapping apparatus adapted to indicate the level differences of the ground over which the apparatus is made to travel, in relation to the distance travelled from a given reference point, the apparatus having a front end and a rear end and includes:
    a first carriage consisting of a longitudinal frame supported at a front end thereof by at least one wheel and at a rear end thereof by at least two spaced-apart coaxial wheels, said front wheels and said rear wheels having their axes distanced from each other by a first distance "A";
    a second carriage consisting of a longitudinal frame attached at a front end thereof to said first carriage at a point substantially coexistent with the axis of said rear wheels, by a link permitting vertical and horizontal inclination as well as a twisting movement of said frame of said second carriage in relation to the frame of said first carriage, said second carriage being supported at its rear end by at least two spaced-apart coaxial wheels at a second distance "B" from said link;
    a device attached to at least one of said wheels of said implement for measuring the distance traveled by said wheel, and to emit a first signal defining said distance;
    a device attached to said two frames for measuring the angle of vertical inclination of said second carriage in relation to said first carriage and for emitting a second signal defining said angle;
    a device attached to said two frames for measuring the angle of horizontal inclination of said second carriage in relation to said first carriage and for emitting a third signal defining said angle;
    a device attached to said two frames for measuring the angle of twist of a second carriage in relation to said first carriage and for emitting a fourth signal defining said angle;
    a computing device adapted to receive the said four signals and to compute the distance traveled and the level and slope of each point along the route traveled by said apparatus in relation to the level of said given reference starting point.

2. The apparatus of claim 1, wherein the distance "A" between the wheels of said first carriage equals the distance "B" between said link and said wheels of said second carriage.

3. The apparatus of claim 1 comprising a transverse boom which is provided at its both ends with distance-measuring devices directed towards the ground and for issuing signals indicating the distance of each said device from the ground surface to said computing means, the latter being programmed to compute the level of each point covered by the path of each said distance-measuring device in relation to the level of said given reference starting point.

4. The apparatus of claim 1, comprising a self-propelled first carriage.

5. The apparatus of claim 1, comprising a first carriage provided with drawbar means for attachment to a traction vehicle.

* * * * *